(12) United States Patent
Ma et al.

(10) Patent No.: US 10,375,461 B2
(45) Date of Patent: Aug. 6, 2019

(54) MOUNTING ASSEMBLY FOR USE IN MOBILE TERMINAL AND MOBILE TERMINAL USING THE SAME

(71) Applicant: BOE TECHNOLOGY GROUP CO., LTD., Beijing (CN)

(72) Inventors: Yongda Ma, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,908

(22) PCT Filed: May 19, 2017

(86) PCT No.: PCT/CN2017/085068
§ 371 (c)(1),
(2) Date: Oct. 12, 2017

(87) PCT Pub. No.: WO2017/206733
PCT Pub. Date: Dec. 7, 2017

(65) Prior Publication Data
US 2018/0316993 A1  Nov. 1, 2018

(30) Foreign Application Priority Data

May 31, 2016 (CN) .................. 2016 2 0518782 U

(51) Int. Cl.
*H04R 1/02* (2006.01)
*H04M 1/03* (2006.01)
*H04M 1/02* (2006.01)

(52) U.S. Cl.
CPC ............ *H04R 1/02* (2013.01); *H04M 1/0202* (2013.01); *H04M 1/026* (2013.01); *H04R 1/021* (2013.01);
(Continued)

(58) Field of Classification Search
CPC .... H04R 1/02; H04R 2499/11; H04R 1/0202; H04R 1/021; H04M 1/026; H04M 1/0277; H04M 1/03
See application file for complete search history.

(56) References Cited

U.S. PATENT DOCUMENTS 6,480,397 B1 *  11/2002  Hsu ................ H04B 1/3833
361/752
2007/0081691 A1 *  4/2007  Park ................ H04M 1/03
381/386

(Continued)

FOREIGN PATENT DOCUMENTS

| CN | 201947325 U | 8/2011 |
| CN | 103517165 A | 1/2014 |
| CN | 205666948 U | 10/2016 |

OTHER PUBLICATIONS

Search Report for International Application No. PCT/CN2017/085068 dated Aug. 16, 2017.

*Primary Examiner* — Sonia L Gay
(74) *Attorney, Agent, or Firm* — Calfee, Halter & Griswold LLP

(57) ABSTRACT

Disclosed is a mounting assembly for use in a mobile terminal. The mobile terminal includes a main frame on which a motherboard is mounted. The mounting assembly includes a rack for mounting thereon at least one of a speaker or a vibrator, and the rack is detachably connectable to the main frame. By means of the mounting assembly, the speaker or the vibrator is not directly mounted on the motherboard of the mobile terminal.

14 Claims, 2 Drawing Sheets

(52) U.S. Cl.
CPC ............ *H04M 1/0277* (2013.01); *H04M 1/03* (2013.01); *H04R 2499/11* (2013.01)

(56) References Cited

U.S. PATENT DOCUMENTS

| | | | |
|---|---|---|---|
| 2008/0166009 A1* | 7/2008 | Dinh .................. | H04M 1/03 |
| | | | 381/392 |
| 2014/0193023 A1* | 7/2014 | Heo .................... | H01Q 1/2283 |
| | | | 381/391 |
| 2015/0131818 A1 | 5/2015 | Chen | |
| 2015/0230014 A1* | 8/2015 | Je ..................... | H04R 1/028 |
| | | | 381/333 |
| 2017/0142837 A1* | 5/2017 | Kim ................... | H01L 51/5237 |

* cited by examiner

MOUNTING ASSEMBLY FOR USE IN MOBILE TERMINAL AND MOBILE TERMINAL USING THE SAME

CROSS-REFERENCE TO RELATED APPLICATIONS

The present application is the U.S. national phase entry of PCT/CN2017/085068, with an international filing date of May 19, 2017, which claims the benefit of Chinese Patent Application No. 201620518782.2, filed on May 31, 2016, the entire disclosures of which are incorporated herein by reference.

TECHNICAL FIELD

The present disclosure relates to a mounting assembly for use in a mobile terminal and a mobile terminal using the mounting assembly.

BACKGROUND

At present, a mobile terminal is generally provided with a mechanism for prompting the user of a use condition of the mobile terminal by sound and/or vibration. Specifically, a sound reminder may be achieved by a sound caused by the vibration of a speaker in the mobile terminal, and a vibration reminder may be achieved by the vibration of a vibrator in the mobile terminal. The speaker and the vibrator are typically mounted on a motherboard of the mobile terminal so that the motherboard vibrates as well during vibrations of the speaker or the vibrator. This may lead to fatigue of solder joints of the electronic components on the motherboard, and thus to the failure of the mobile terminal.

SUMMARY

Embodiments of the present disclosure provide a mounting assembly for use in a mobile terminal and a mobile terminal using the mounting assembly, which seek to alleviate, mitigate, or eliminate at least one of the above-mentioned problems.

According to an aspect of the present disclosure, a mounting assembly is provided for use in a mobile terminal comprising a main frame on which a motherboard is mounted. The mounting assembly comprises a rack for mounting thereon at least one of a speaker or a vibrator. The rack is detachably connectable to the main frame.

In some embodiments, the rack comprises: a sub-frame portion extending along at least a portion of an outline of the main frame and having an engaging surface for detachably connecting to the main frame; and a connecting portion extending inwardly from an inner side wall of the sub-frame portion to provide a mounting area for the at least one of the speaker or the vibrator.

In some embodiments, the mounting assembly further comprises a cushion for providing buffering between the sub-frame portion and the main frame.

In some embodiments, the cushion is arranged to extend along the engaging surface of the sub-frame portion.

In some embodiments, the cushion comprises a plurality of sections having different thicknesses from each other.

In some embodiments, the sub-frame portion is arranged such that the engaging surface is conformal to the cushion.

In some embodiments, the sub-frame portion further has an end surface opposite to the engaging surface in a thickness direction and engageable with a rear cover of the mobile terminal, and the connecting portion extending inwardly from a position between the end surface and the engaging surface on the inner side wall of the sub-frame portion so that the at least one of the speaker or the vibrator mounted on the connecting portion is suspended in a space between the rear cover and the main frame when the rear cover is engaged with the end surface.

In some embodiments, the sub-frame portion extends along an outline of the main frame to form a closed annular structure.

In some embodiments, the connecting portion extends in a plane defined by the annular structure to cover the annular structure.

In some embodiments, the sub-frame portion further has an end surface opposite to the engaging surface in a thickness direction, and the connecting portion is arranged such that an outer surface of the connecting portion meets the end surface of the sub-frame portion.

In some embodiments, the sub-frame portion and the connecting portion are integrally formed such that the rack can serve as a rear cover of the mobile terminal.

In some embodiments, the connecting portion is made of an elastic material.

In some embodiments, the mounting assembly further comprises the at least one of the speaker or the vibrator.

In some embodiments, the mounting assembly further comprises a connecting electrode for providing an electrical connection between the motherboard and the at least one of the speaker or the vibrator.

In some embodiments, the rack is detachably connectable to the main frame by means of at least one selected from the group consisting of screwing and snap-fitting.

According to another aspect of the present disclosure, a mobile terminal is provided which comprises the mounting assembly as described above.

These and other aspects of the present disclosure will be apparent from and elucidated with reference to the embodiment(s) described hereinafter.

BRIEF DESCRIPTION OF THE DRAWINGS

Further details, features and advantages of the present disclosure are disclosed in the following description of the exemplary embodiments taken in conjunction with the accompanying drawings, in which.

The drawings are not necessarily drawn to scale.

DETAILED DESCRIPTION

Embodiments of the present disclosure will be described below in detail with reference to the accompanying drawings.

It will be understood that spatially relative terms, such as "inner", "inwardly", "outer", "above", and the like, may be used herein for ease of description to describe one element or feature's relationship to another element(s) or feature(s) as illustrated in the figures. Specifically, the terms "inner", "inwardly" and "outer" related to the mounting assembly are used relative to the outside and inside of the mobile terminal when the mounting assembly is assembled in the mobile terminal. For example, a surface facing the inside of the mobile terminal is referred to as an inner surface, while a surface facing the outside of the mobile terminal as an outer surface. It will also be understood that when an element is referred to as being "on", "connected to", or "coupled to" another element, it can be directly on, connected, or coupled to the other element, or intervening elements may be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein. The term "outline" as used herein refers to a boundary line of an orthographic projection of an object on a background.

Figure 1:
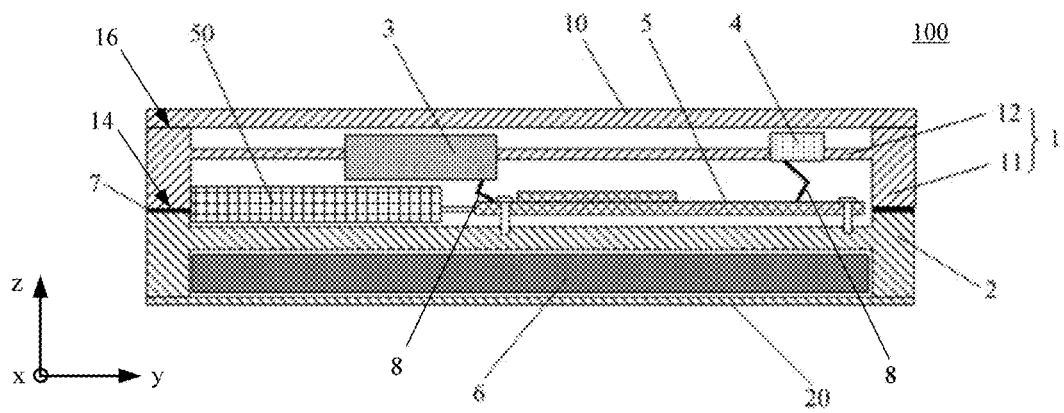
FIG. 1 schematically illustrates a cross-sectional view of a mobile terminal which includes a mounting assembly according to an embodiment of the present disclosure in a y-z plane.

FIG. 1 schematically illustrates a cross-sectional view of a mobile terminal 100 which includes a mounting assembly according to an embodiment of the present disclosure in a y-z plane. In the illustrated coordinate system, the x-axis indicates a length direction of the mobile terminal 100, the y-axis indicates a width direction of the mobile terminal 100, and the z-axis indicates a thickness direction of the mobile terminal 100.

The mobile terminal 100 includes a main frame 2 and a motherboard 5 mounted on the main frame 2. The motherboard 5 may be provided with various electronic components (not shown). The mobile terminal 100 further includes a display module 6, a power supply 50 for supplying power to the display module 6 and the electronic components on the motherboard 5, a front cover 20, and a rear cover 10.

The mounting assembly includes a rack 1 for mounting thereon a speaker 3 and/or a vibrator 4. The rack 1 is detachably connectable to the main frame 2. For example, the rack 1 is detachably connected to the main frame 2 by means of screwing and/or snap-fitting. The speaker 3 and/or the vibrator 4 are not directly mounted on the motherboard 5 of the mobile terminal 100 due to the mounting assembly (and specifically the rack 1). The vibrations generated by the speaker 3 and/or the vibrator 4 may thus be attenuated when passing through the rack 1 and the detachable connection between the rack 1 and the main frame 2 so that the vibration reaching the motherboard 5 is reduced in terms of energy. This may facilitate alleviation or mitigation of the fatigue of the solder joints of the electronic components on the motherboard 5, thereby improving the reliability of the mobile terminal 100.

In some embodiments, as shown in FIG. 1, the rack 1 includes a sub-frame portion 11 and a connecting portion 12. The sub-frame portion 11 extends along an outline of the main frame 2 and has an engaging surface 14 for detachably connecting to the main frame 2. The sub-frame portion 11 does not necessarily extend along the entire outline of the main frame 2. For example, the sub-frame portion 11 may be U-shaped or L-shaped in an x-y plane when viewed from above, or it may be formed by two portions that are separate from or parallel to each other.

It will be appreciated that the planar engaging surface 14 of the sub-frame portion 11 shown in FIG. 1 is exemplary. Other embodiments are contemplated. For example, the engaging surface 14 may have a Z-shaped cross-section in a y-z plane and the main frame 2 may have an engaging surface that engages the Z-shaped engaging surface 14 to facilitate stable coupling of the rack 1 (and specifically the sub-frame portion 11) and the main frame 2.

The connecting portion 12 extends inwardly from an inner side wall of the sub-frame portion 11 to provide a mounting area for the speaker 3 and/or the vibrator 4. In the embodiment of FIG. 1, the sub-frame portion 11 further has an end surface 16 which is opposed to the engaging surface 14 in the thickness direction (z-axis direction in FIG. 1) and which is engageable with the rear cover 10 of the mobile terminal 100, and the connecting portion 12 extends inwardly from a position between the end surface 16 and the engaging surface 14 on the inner side wall of the sub-frame portion 11 so that the speaker 3 and/or the vibrator 4 mounted on the connecting portion 12 are suspended in a space between the rear cover 10 and the main frame 2 when the rear cover 10 is engaged with the end surface 16. In some embodiments, the connecting portion 12 may be made of an elastomeric material. This may further facilitate the attenuation of the vibrations from the loudspeaker 3 and/or the vibrator 4.

In some embodiments, as shown in FIG. 1, the mounting assembly further includes a cushion 7 for providing buffering between the sub-frame portion 11 and the main frame 2. The cushion 7 may be made of an elastic material. The cushion 7 is arranged to extend along the engaging surface 14 of the sub-frame portion 11. The cushion 7 may further facilitate the attenuation of the vibrations from the speaker 3 and/or the vibrator 4 before reaching the main frame 2.

Figure 2:
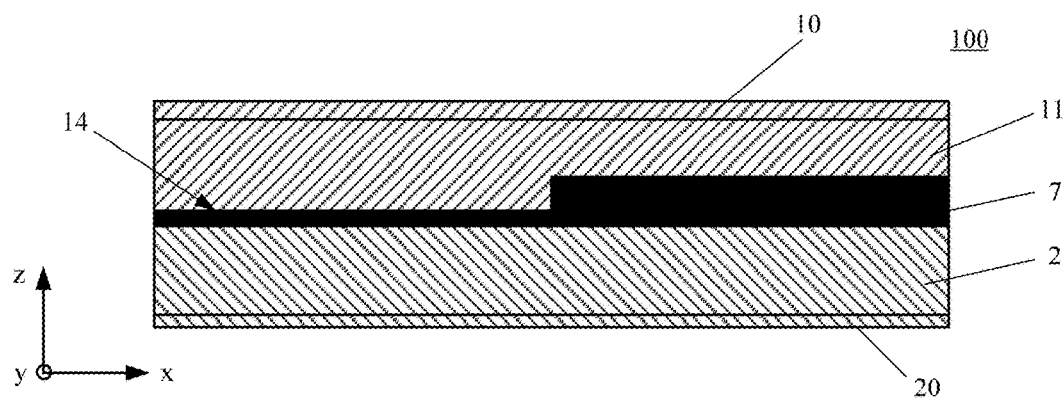
FIG. 2 schematically illustrates a cross-sectional view of the mobile terminal of FIG. 1 in an x-z plane.

FIG. 2 schematically illustrates a cross-sectional view of the mobile terminal 100 of FIG. 1 in an x-z plane.

In this embodiment, the cushion 7 includes a plurality of sections which have different thicknesses from each other. In the example of FIG. 2, the cushion 7 comprises two sections having different thicknesses. This may change the frequency of the vibrations from the speaker 3 and/or the vibrator 4 by different amounts so that the main frame 2 does not resonate with the speaker 3 and/or the vibrator 4, thereby further alleviating or mitigating the fatigue of the solder joints of the electronic components on the motherboard 5.

In some embodiments, as shown in FIG. 2, the sub-frame portion 11 is arranged such that the engaging surface 14 conforms to the cushion 7. Specifically, the engaging surface 14 has a large distance from the main frame 2 at a position where the cushion 7 has a large thickness and has a smaller distance from the main frame 2 at a position where the cushion 7 has a smaller thickness.

It will be appreciated that the cushion 7 shown in FIG. 2 is exemplary. Other embodiments are contemplated. For example, the cushion 7 may have a thickness that changes continuously in its direction of extension.

Figure 3:
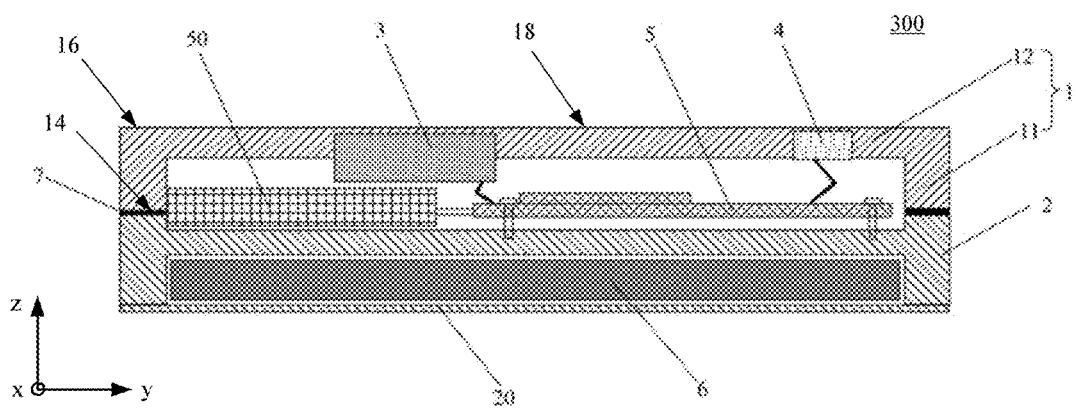
FIG. 3 schematically illustrates a cross-sectional view of a mobile terminal which includes a mounting assembly according to an embodiment of the present disclosure in a y-z plane.
Figure 4:
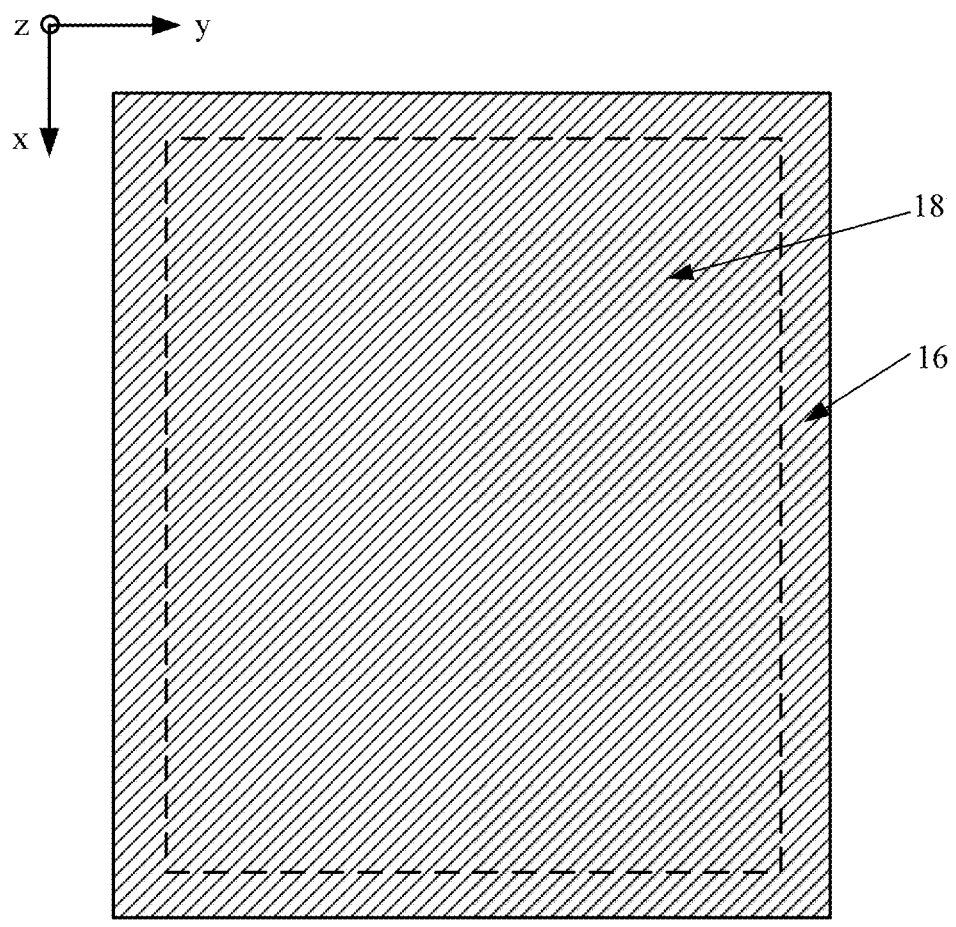
FIG. 4 schematically illustrates a plan view of the mounting assembly of FIG. 3 in an x-y plane.

FIG. 3 schematically illustrates a cross-sectional view of a mobile terminal 300 which includes a mounting assembly according to an embodiment of the present disclosure in a y-z plane, and FIG. 4 schematically illustrates a plan view of the mounting assembly of FIG. 3 in an x-y plane.

Similar to the embodiments as described above, in the embodiment of FIG. 3, the mounting assembly includes a rack 1 for mounting thereon the speaker 3 and/or the vibrator 4, and the rack 1 is detachably connectable to the main frame 2 of the mobile terminal 300. Specifically, the rack 1 includes a sub-frame portion 11 extending along the outline of the main frame 2 and having an engaging surface 14 for detachably connecting to the main frame 2, and a connecting portion 12 extending inwardly from the inner side wall of the sub-frame portion 11 to provide a mounting area for the speaker 3 and/or the vibrator 4.

In this embodiment, as shown in FIG. 4, the sub-frame portion 11 extends along the outline of the main frame 2 to form a closed annular structure. The connecting portion 12 extends in a plane defined by the annular structure to cover the annular structure. The sub-frame portion 11 further has an end surface 16 opposite to the engaging surface 14 in the thickness direction (z-axis direction in FIG. 3), and the connecting portion 12 is arranged so that the outer surface 18 of the connecting portion 12 meets the end surface 16 of the sub-frame portion 11. In some embodiments, the sub-frame portion 11 and the connecting portion 12 are integrally formed so that the rack 1 can serve as a rear cover of the mobile terminal 300.

It will be appreciated that the planar end surface 16 of the sub-frame portion 11 shown in FIG. 3 is exemplary. Other embodiments are contemplated. For example, the cross-section of the end surface 16 in the y-z plane may be curved.

In various embodiments, the connecting portion 12 may be provided with corresponding holes or slots for mounting the speaker 3 and/or the vibrator 4. Other embodiments are contemplated. For example, the speaker 3 and/or the vibrator 4 may be fixed to the connecting portion 12 by means of snap-fitting or gluing.

In addition, corresponding connecting electrodes 8 may provide an electrical connection to the motherboard 5 for the speaker 3 and the vibrator 4. Examples of the connecting electrodes 8 include, but are not limited to, wires or elastic sheets. In the case of the elastic sheet, the connecting electrode 8 may facilitate alleviation or mitigation of the vibrations from the speaker 3 and the vibrator 4 due to its elasticity. Additionally, when the speaker 3 and the vibrator 4 simultaneously vibrate at different frequencies, although their vibrations are passed to the motherboard 5 through the corresponding connecting electrodes 8, resonance of the motherboard 5 will not occur due to the different vibration frequencies.

In various embodiments, examples of the mobile terminal may include and are not limited to a vehicle-mounted mobile terminal or a handheld mobile terminal, such as e.g., a mobile phone, a tablet, or a navigator.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The foregoing are only specific embodiments of the present disclosure, and the present disclosure is not limited thereto. Various variations or substitutions that may be readily conceived of by those skilled in the art are intended to be encompassed in the scope of the present disclosure. Accordingly, the scope of protection of the present disclosure is subject to the appended claims.

What is claimed is:

1. A mounting assembly for use in a mobile terminal, the mobile terminal comprising a main frame on which a motherboard is mounted, the mounting assembly comprising:
   a rack for mounting thereon at least one of a speaker or a vibrator, the rack comprising:
      a sub-frame portion extending along at least a portion of an outline of the main frame and having an engaging surface for detachably connecting to the main frame; and
      a connecting portion extending inwardly from an inner side wall of the sub-frame portion to provide a mounting area for the at least one of the speaker or the vibrator; and
   a cushion for providing buffering between the sub-frame portion and the main frame,
   wherein the rack is detachably connectable to the main frame, and
   wherein the cushion is arranged to extend along the engaging surface of the sub-frame portion.

2. The mounting assembly of claim 1, wherein the cushion comprises a plurality of sections having different thicknesses from each other.

3. The mounting assembly of claim 2, wherein the sub-frame portion is arranged such that the engaging surface is conformal to the cushion.

4. The mounting assembly of claim 1, wherein the sub-frame portion further has an end surface opposite to the engaging surface in a thickness direction and engageable with a rear cover of the mobile terminal, and wherein the connecting portion extending inwardly from a position between the end surface and the engaging surface on the inner side wall of the sub-frame portion so that the at least one of the speaker or the vibrator mounted on the connecting portion is suspended in a space between the rear cover and the main frame when the rear cover is engaged with the end surface.

5. The mounting assembly of claim 1, wherein the sub-frame portion extends along an outline of the main frame to form a closed annular structure.

6. The mounting assembly of claim 5, wherein the connecting portion extends in a plane defined by the annular structure to cover the annular structure.

7. The mounting assembly of claim 6, wherein the sub-frame portion further has an end surface opposite to the engaging surface in a thickness direction, and wherein the connecting portion is arranged such that an outer surface of the connecting portion meets the end surface of the sub-frame portion.

8. The mounting assembly of claim 7, wherein the sub-frame portion and the connecting portion are integrally formed such that the rack can serve as a rear cover of the mobile terminal.

9. The mounting assembly of claim 1, wherein the connecting portion is made of an elastic material.

10. The mounting assembly of claim 1, further comprising the at least one of the speaker or the vibrator.

11. The mounting assembly of claim 1, further comprising a connecting electrode for providing an electrical connection between the motherboard and the at least one of the speaker or the vibrator.

12. The mounting assembly of claim 1, wherein the rack is detachably connectable to the main frame by means of at least one selected from the group consisting of screwing and snap-fitting.

13. A mobile terminal comprising the mounting assembly as claimed in claim 1.

14. A mobile terminal comprising the mounting assembly as claimed in claim 2.

* * * * *